United States Patent
Li et al.

(10) Patent No.: US 12,341,575 B2
(45) Date of Patent: Jun. 24, 2025

(54) INFORMATION TRANSMISSION METHOD, REFLECTING DEVICE, BASE STATION, SYSTEM, ELECTRONIC DEVICE, AND MEDIUM

(71) Applicant: ZTE CORPORATION, Guangdong (CN)

(72) Inventors: Bin Li, Guangdong (CN); Feng Wu, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 31 days.

(21) Appl. No.: 18/560,964

(22) PCT Filed: May 17, 2022

(86) PCT No.: PCT/CN2022/093250
§ 371 (c)(1),
(2) Date: Nov. 15, 2023

(87) PCT Pub. No.: WO2022/247685
PCT Pub. Date: Dec. 1, 2022

(65) Prior Publication Data
US 2024/0259051 A1    Aug. 1, 2024

(30) Foreign Application Priority Data

May 27, 2021   (CN) .......................... 202110585961.3

(51) Int. Cl.
*H04B 7/04* (2017.01)
*H04B 7/145* (2006.01)
(Continued)

(52) U.S. Cl.
CPC ........ *H04B 7/04013* (2023.05); *H04W 40/22* (2013.01); *H04B 7/145* (2013.01); *H04B 7/15* (2013.01)

(58) Field of Classification Search
CPC ...... H04B 7/04013; H04B 7/145; H04B 7/15; H04B 7/155; H04B 7/18502;
(Continued)

(56) References Cited

U.S. PATENT DOCUMENTS

| | | | | |
|---|---|---|---|---|
| 2011/0244786 A1* | 10/2011 | Fujii | .................... | H01Q 19/104 455/7 |
| 2014/0266870 A1 | 9/2014 | Koduru et al. | | |
| 2023/0093364 A1* | 3/2023 | Kumari | .................. | G01S 7/006 342/58 |

FOREIGN PATENT DOCUMENTS

| | | |
|---|---|---|
| CN | 102208939 A | 10/2011 |
| CN | 102938670 A | 2/2013 |

(Continued)

OTHER PUBLICATIONS

Japan Patent Office, first Office action dated Jun. 4, 2024, for corresponding JP application No. 2023-545889.
(Continued)

*Primary Examiner* — Sung S Ahn
(74) *Attorney, Agent, or Firm* — Li & Cai Intellectual Property (USA) Office

(57) ABSTRACT

The present application provides an information transmission method, a reflecting device, a base station, a system, an electronic device, and a medium. The information transmission method includes: acquiring communication information sent from a base station, where the communication information is carried by means of a communication signal; and reflecting, according to a reflection weight of a reflecting device, the communication signal to an airborne terminal by means of a beam corresponding to the reflection weight.

20 Claims, 13 Drawing Sheets

(51) Int. Cl.
*H04B 7/15* (2006.01)
*H04W 40/22* (2009.01)

(58) Field of Classification Search
CPC .. H04B 7/18504; H04W 40/22; H04W 40/20; H04W 4/44; H04W 40/02; H04W 4/40; H04W 4/42
See application file for complete search history.

(56) References Cited

FOREIGN PATENT DOCUMENTS

| | | | |
|---|---|---|---|
| CN | 111181615 A | 5/2020 | |
| CN | 111245494 A | 6/2020 | |
| CN | 112039567 A | 12/2020 | |
| JP | 2021197625 A | 12/2021 | |
| WO | WO 2020132145 A1 | 6/2020 | |

OTHER PUBLICATIONS

WIPO, International Search Report issued on Jul. 15, 2022.
European Patent Office, the Extended European Search Report dated Mar. 3, 2025, for corresponding EP application No. 22810412.1.

* cited by examiner

INFORMATION TRANSMISSION METHOD, REFLECTING DEVICE, BASE STATION, SYSTEM, ELECTRONIC DEVICE, AND MEDIUM

CROSS-REFERENCE TO RELATED APPLICATIONS

This application is a National Phase Application filed under 35 U.S.C. 371 as a national stage of PCT/CN2022/093250, filed on May 17, 2022, an application claiming the priority to the patent application No. 202110585961.3 filed with the Chinese Patent Office on May 27, 2021, the entire contents of which are incorporated hereby by reference.

TECHNICAL FIELD

The present application relates to, but is not limited to, the field of radio communication technology.

BACKGROUND

With the development of the radio communication technology, the coverage area of the communication network is becoming larger and larger. People can obtain excellent communication services in vehicles moving at a high speed, such as automobiles or trains. However, in an air coverage radio communication system, a line of sight (LOS) path is typically used for transmission of communication signals, in which due to lack of a reflector, it is difficult for a radio channel in the system to support multi-stream transmission in the case of more than two streams. As a result, a single terminal of the air coverage radio communication network has low traffic, passengers in an aircraft cannot obtain excellent communication services, and the user experience is thus reduced.

SUMMARY

The present application provides an information transmission method, a reflecting device, a base station, a system, an electronic device, and a medium.

In a first aspect, the present application provides an information transmission method applied to a reflecting device. The method includes: acquiring communication information sent from a base station, wherein the communication information is carried by means of a communication signal; and reflecting, according to a reflection weight of the reflecting device, the communication signal to an airborne terminal by means of a beam corresponding to the reflection weight.

In a second aspect, the present application further provides an information transmission method applied to a base station. The method includes: sending a communication signal carrying communication information to a reflecting device so that the reflecting device reflects, according to a reflection weight of the reflecting device, the communication signal to an airborne terminal by means of a beam corresponding to the reflection weight.

In a third aspect, the present application further provides a reflecting device, including: a first acquiring module configured to acquire communication information sent from a base station, wherein the communication information is carried by means of a communication signal; and a reflecting module configured to reflect, according to a reflection weight of the reflecting device, the communication signal to an airborne terminal by means of a beam corresponding to the reflection weight.

In a fourth aspect, the present application further provides a base station, including: a carrying module configured to carry communication information through a communication signal; and a sending module configured to send the communication signal to a reflecting device so that the reflecting device reflects, according to a reflection weight of the reflecting device, the communication signal to an airborne terminal by means of a beam corresponding to the reflection weight.

In a fifth aspect, the present application further provides an information transmission system, including: a reflecting device configured to perform the information transmission method according to the first aspect; a base station configured to perform the information transmission method according to the second aspect; and an airborne terminal configured to acquire communication information sent from the base station, generate response information according to the communication information, and transmit the response information to the reflecting device through a target transmission channel so that the reflecting device transmits the response information to the base station.

In a sixth aspect, the present application further provides an electronic device, including: one or more processors; and a memory having one or more programs stored thereon which, when executed by the one or more processors, cause the one or more processors to implement any one of the information transmission methods described herein.

In a seventh aspect, the present application further provides a readable storage medium having a computer program stored thereon which, when executed by a processor, causes any one of the information transmission methods described herein to be implemented.

DETAIL DESCRIPTION OF EMBODIMENTS

For clarity and better understanding of the objects, technical solution and advantages of the application, implementations of the present application will now be described in detail in conjunction with the accompanying drawings. It should be noted that the implementations of the present application and features therein may be combined with each other in any manner as long as they are not contradictory.

Figure 1:
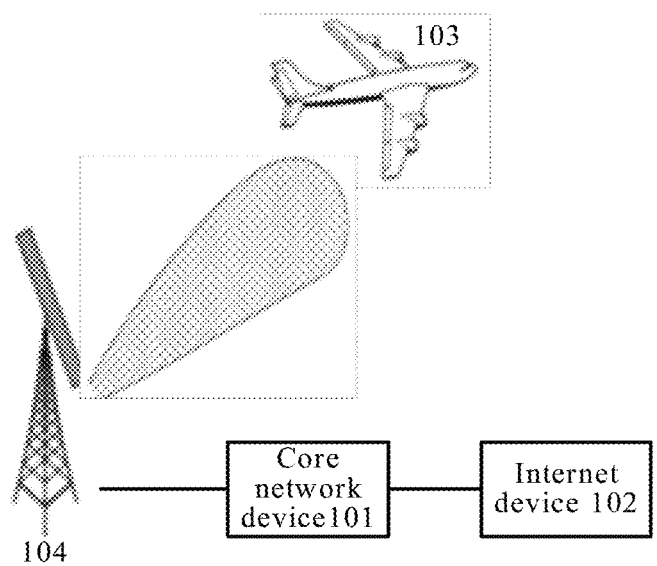
FIG. 1 shows a schematic structural diagram of an air to ground radio communication system according to the present application.

FIG. 1 shows a schematic structural diagram of an air to ground radio communication system according to the present application. As shown in FIG. 1, the air to ground (ATG) radio communication system includes: a core network device 101, an internet device 102, a base station 104 and an airborne terminal 103.

The base station 104 is a ground base station, and the airborne terminal 103 is a terminal installed in an aircraft. The base station 104 is desired to be in communication with not only the airborne terminal 103, but also a smart terminal (such as a smart phone, a tablet computer, etc.) used by a passenger in the aircraft.

When the base station 104 communicates with the smart terminal used by the passenger in the aircraft, the communication is implemented through an airborne mobile hotspot (Wi-Fi) device installed in the aircraft, in which the airborne Wi-Fi device needs to bear load and a high communication pressure is involved. In addition, the aircraft can move at a speed up to 800 to 1200 Km/h, belonging to transportation means of ultra-high speed movement, and passengers in the aircraft cannot obtain excellent communication services.

In the case where a plurality of passengers in the aircraft use mobile data download or upload simultaneously, individual passengers cannot obtain the desired bandwidth resource. In order to meet the bandwidth requirements of each individual passenger, a bandwidth of the ATG radio communication system is desired to be increased, or multi-stream transmission is desired to be adopted between the airborne terminal 103 and the base station 104 as much as possible. However, bandwidth resources are extremely valuable resources, and it is impossible to be put all bandwidth resources into a private network system such as an ATG radio communication system. In addition, an LOS path is typically used for transmission of communication signals between the airborne terminal 103 and the base station 104, where the LOS path indicates that there is a clear, unblocked communication channel between the airborne terminal 103 and the base station 104, and the airborne terminal 103 can directly receive a communication signal sent from the base station 104. Due to the particularity of the communication channel corresponding to the LOS path, the communication channel based on the LOS path cannot support multi-stream transmission. How to increase the number of single user data streams and the data rate in an LOS path dominant environment, such as air coverage and the like, is an urgent problem to be solved.

Figure 2:
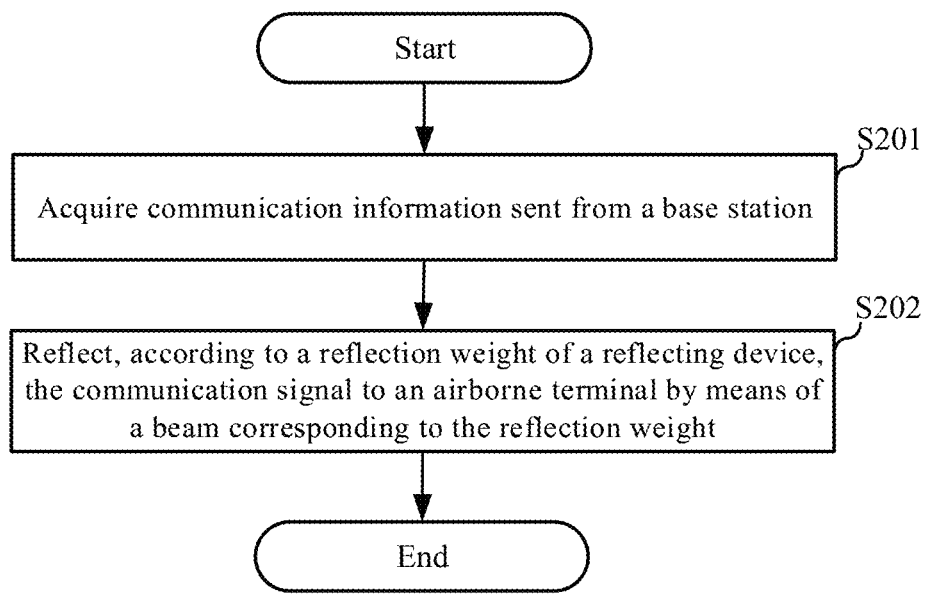
FIG. 2 shows a schematic flowchart of an information transmission method according to the present application.

A first aspect of the present application provides an information transmission method. FIG. 2 shows a schematic flowchart of an information transmission method according to the present application. The information transmission method may be applied to a reflecting device. As shown in FIG. 2, the information transmission method of the present application may include the following operations S201 and S202.

At operation S201, communication information sent from a base station is acquired.

The communication information is carried by means of a communication signal. The communication information includes: at least one of broadcast information, channel state information, downlink control information, or downlink service information.

It should be noted that the reflecting device may be an active device or a passive device. Under the condition that the reflecting device is determined to be an active device, the active reflecting device may adjust, according to the control information sent from the base station, an angle of a beam corresponding to a target transmission channel between the reflecting device and the airborne terminal, so that communication information can be transmitted to the airborne terminal through the target transmission channel more accurately.

Under the condition that the reflecting device is determined to be a passive device, the passive reflecting device cannot automatically adjust a reflection weight between the passive reflecting device and the airborne terminal. When the passive reflecting device is installed, an installation position of the passive reflecting device is a position determined by preset network planning parameters, and includes at least one of installation angle information, installation height information or distance information between the passive reflecting device and the base station. It should be noted that, instead of a general obstacle, the passive reflecting device is a device specifically configured to reflect a communication signal to the airborne terminal.

The passive reflecting device may adopt a beam (i.e., a wide beam) with a beam width greater than or equal to a preset width threshold, so that the probability of the airborne terminal receiving the communication information is increased. The beam width includes: a horizontal beam width and/or a vertical beam width. The preset width threshold includes: a half power beam width (HPBW).

At operation S202, the communication signal is reflected, according to a reflection weight of a reflecting device, to an airborne terminal by means of a beam corresponding to the reflection weight.

Herein, "reflecting the communication signal to an airborne terminal by means of a beam corresponding to the reflection weight" refers to carrying the communication signal on a beam corresponding to the reflection weight, and reflecting the beam carrying the communication signal to the airborne terminal.

The reflection weight of the reflecting device may be adjusted adaptively so that a direction of the beam corresponding to the communication signal reflected to the airborne terminal is more accurate. The reflection weight may be a reflecting angle of the reflecting device, or a beam width corresponding to the reflection signal, or the like. The above description of the reflection weight is merely exemplary, and the reflection weight may be specifically set according to the specific implementation. Other reflection weights that are not described herein also fall within the protection scope of the present application, and are not described in detail here.

In the present application, by sending a communication signal carrying communication information to a reflecting device, the reflecting device reflects, according to a reflection weight of the reflecting device, the communication signal to the airborne terminal through a beam corresponding to the reflection weight, so that the communication information transmitted through a target transmission channel can be ensured to reach the airborne terminal smoothly, and the channel quality of air coverage is improved; and a reflecting device is added based on a conventional transmission channel between a base station and an airborne terminal, which increases the communication paths between the base station and the airborne terminal as well as the number of concurrent data streams sent to the airborne terminal from the base station, enables the air coverage radio communication system to support multi-stream transmission, and improves the communication rate of the terminal.

Figure 3:
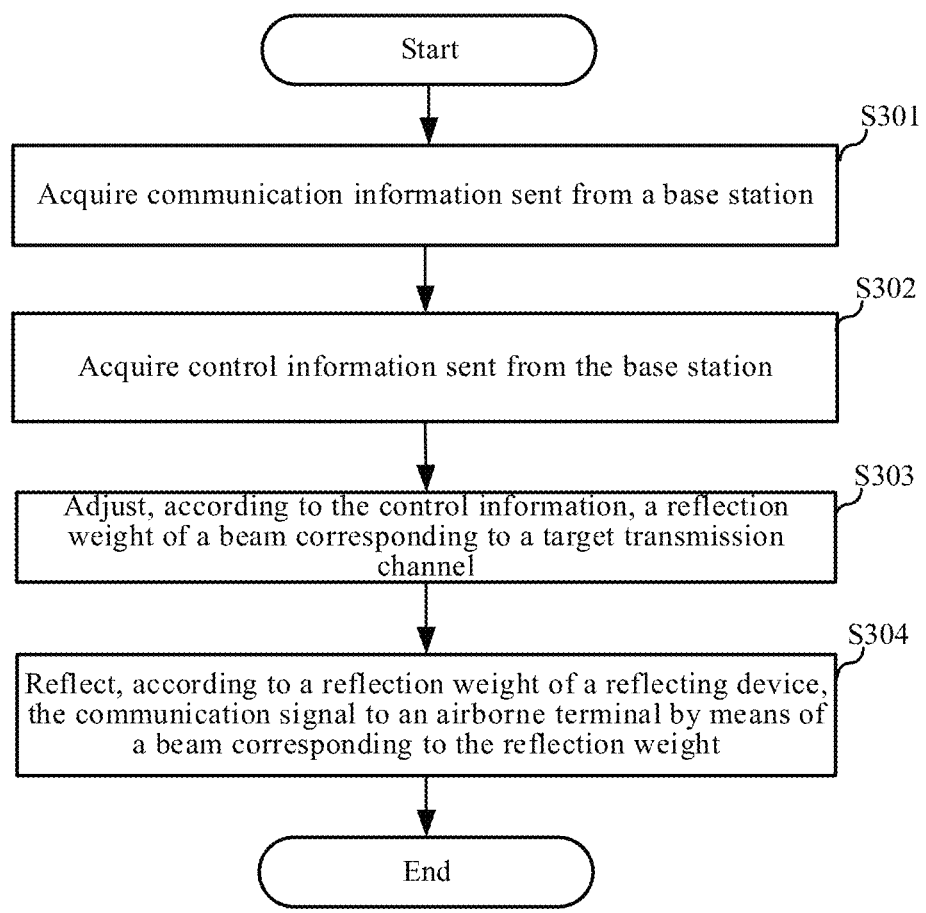
FIG. 3 shows a schematic flowchart of an information transmission method according to the present application.

FIG. 3 shows a schematic flowchart of an information transmission method according to the present application. The information transmission method may be applied to a reflecting device. As shown in FIG. 3, the information transmission method of the present application may include the following operations S301 to S304.

At operation S301, communication information sent from a base station is acquired.

In an exemplary implementation, the communication information sent from the base station is acquired through a first transmission channel and/or a second transmission channel. The first transmission channel is a line of sight path transmission channel between the reflecting device and the base station, and the second transmission channel is a no line of sight path transmission channel between the reflecting device and the base station.

It should be noted that the no line of sight path transmission channel is a transmission channel determined based on a no line of sight (NLOS) path. The line of sight path transmission channel is a transmission channel determined based on an LOS path.

For example, a plurality of reflecting devices (e.g., a first reflecting device and a second reflecting device) are provided between the airborne terminal and the base station, which block communication signals between the airborne terminal and the base station. The communication information sent from the base station may directly reach the second reflecting device via a first transmission channel, or may reach the second reflecting device via a second transmission channel (e.g., the communication information sent from the base station is forwarded by the first reflecting device and then obtained by the second reflecting device), so that a current device (i.e., the second reflecting device) obtains the communication information sent from the base station through a plurality of transmission channels, which can increase the number of concurrent data streams sent from the base station to the current device, and improve the communication quality of the current device.

At operation S302, control information sent from the base station is acquired.

The control information includes adjustment information of an angle size, and/or adjustment information of a direction of a beam corresponding to the target transmission channel.

In an exemplary implementation, the reflecting device includes a reconfigurable intelligent surface (RIS) device which can automatically adjust an angle of the beam corresponding to the target transmission channel between the RIS device and the airborne terminal according to the obtained control information.

At operation S303, a reflection weight of a beam corresponding to a target transmission channel is adjusted according to the control information.

In an exemplary implementation, a plurality of transmission channels are provided between the reflecting device and the airborne terminal, and one target transmission channel is selected from the plurality of transmission channels to serve as a transmission channel for the communication information. With the target transmission channel as the transmission channel for the communication information, more accurate communication information can be ensured to be transmitted to the airborne terminal.

The RIS device may increase or reduce, according to the adjustment information of the angle size, the reflection weight of the beam corresponding to the target transmission channel between the RIS device and the airborne terminal; or may adjust, according to the adjustment information of the direction of the beam corresponding to the target transmission channel, a horizontal direction and/or a vertical direction of the beam corresponding to the target transmission channel; or may simultaneously adjust, according to the control information, the direction of the beam corresponding to the target transmission channel and the angle size of the beam corresponding to the target transmission channel. In this way, the beam corresponding to the target transmission channel can be aimed at the airborne terminal, and the accuracy of the target transmission channel can be ensured.

It should be noted that the above description of the control information is merely exemplary, and other kinds of control information that are not described herein also fall within the protection scope of the present application and may be specifically set according to specific situations, which are not described in detail here.

At operation S304, the communication signal is reflected, according to a reflection weight of a reflecting device, to an airborne terminal by means of a beam corresponding to the reflection weight.

It should be noted that the conventional transmission channel between a base station and an airborne terminal is a transmission channel corresponding to/based on the LOS path, and on this basis, the addition of the target transmission channel can enrich the transmission channels between the base station and the airborne terminal, and increase the number of concurrent data streams sent to the airborne terminal from the base station. In this way, the airborne terminal can receive the communication information sent from the base station through a plurality of different transmission channels, so that the signal quality of the airborne terminal is improved, and the integrity and accuracy of the communication information received by the airborne terminal are guaranteed.

In the present application, the communication information sent from the base station is acquired through a first transmission channel and/or a second transmission channel. In other words, the communication information sent from the base station is obtained through a plurality of transmission channels, which can increase the number of concurrent data streams sent from the base station to the current device, and improve the communication quality of the current device. In addition, the control information is acquired through a first transmission channel (i.e., a line of sight path transmission channel between the current device and the base station), so that the accuracy of the control information can be ensured; and the reflection weight is adjusted through the control information, so that the communication information transmitted through a target transmission channel can be ensured to reach the airborne terminal smoothly, and the channel quality of air coverage is improved.

In an exemplary implementation, before adjusting, according to the control information, the reflection weight of the beam corresponding to the target transmission channel, the method further includes: acquiring location information of the reflecting device and location information of the airborne terminal; and determining the control information according to the location information of the airborne terminal and the location information of the reflecting device.

The location information of the airborne terminal may include longitude and latitude information, the location information of the current device may also include longitude and latitude information, from which relative positions of the airborne terminal and the current device can be accurately calculated, and thereby the control information can be determined.

By determining the location information of the airborne terminal and the location information of the current device specifically from the longitude and latitude information, the accuracy of the location information of each device, and thus the accuracy of the control information, can be further improved.

In an exemplary implementation, the reflecting device includes a plurality of reflecting units to be used; and determining the control information according to the location information of the airborne terminal and the location information of the reflecting device includes: selecting, according to the location information of the airborne terminal and the location information of the reflecting device, a target reflecting unit from the plurality of reflecting units to be used, and determining a reflection weight corresponding to the target reflecting unit; and determining the control information according to the reflection weight corresponding to the target reflecting unit.

Each of the reflecting units to be used may be a passive reflecting element of low cost, or an active reflecting element. Different reflecting elements correspond to different reflection weights.

From the location information of the airborne terminal and the location information of the current device, a specific orientation (e.g., relative position information (e.g., amplitude information) and/or relative angle information (e.g., phase information), etc.) of the airborne terminal relative to the reflecting device can be determined, from which whether a certain reflecting unit is suitable to be used as a target reflecting unit is determined. The target reflecting unit has to satisfy a preset reflection condition (e.g., a reflecting angle of the target reflecting unit satisfies the relative angle information of the airborne terminal relative to the reflecting device, and/or a location of the target reflecting unit can facilitate transmission of a reflection signal to the airborne terminal, etc.).

Further, a plurality of target reflecting units may be provided, and determining the control information according to the reflection weight corresponding to the target reflecting unit (or the reflection weight of the target reflecting unit) includes: ranking the plurality of target reflecting units according to reflection weights corresponding to the target reflecting units to obtain a ranking result, for example, taking a target reflecting unit with a maximum reflection weight gain as a final target reflecting unit, and determining the control information according to the reflection weight corresponding to the final target reflecting unit. By taking the target reflecting unit with the maximum reflection weight gain as the final target reflecting unit, the accuracy of the control information can be improved.

The control information is determined according to the information (such as amplitude information and/or phase information) of the reflection weights corresponding to different reflecting units, so that a plurality of reflecting units can implement the target transmission channel collaboratively, thereby realizing adjustability of the target transmission channel and remarkably improving the performance of the radio communication network.

In an exemplary implementation, the target transmission channel is a channel corresponding to a beam based on an enhanced or null signal. The null signal is a signal aiming to amplify a useful signal and suppress interference signals to the maximum extent, and align a main lobe of the beam with an incident direction of the useful signal. By means of the null signal, a minimum gain point in a directional diagram of the beam can be obtained, thereby ensuring the accuracy of the beam and further improving the accuracy of the target transmission channel.

In an exemplary implementation, after reflecting, according to the reflection weight of the reflecting device, the communication signal to the airborne terminal by means of the beam corresponding to the reflection weight, the method further includes: reflecting a beam corresponding to a response signal sent from the airborne terminal to the base station.

The response signal carries a response message which is information fed back by the airborne terminal for the communication information.

By reflecting the beam (carrying the response signal) corresponding to the response signal sent from the airborne terminal to the base station, the base station can accurately acquire the response information fed back by the airborne terminal, and the normal operation of communication is ensured.

Figure 4:
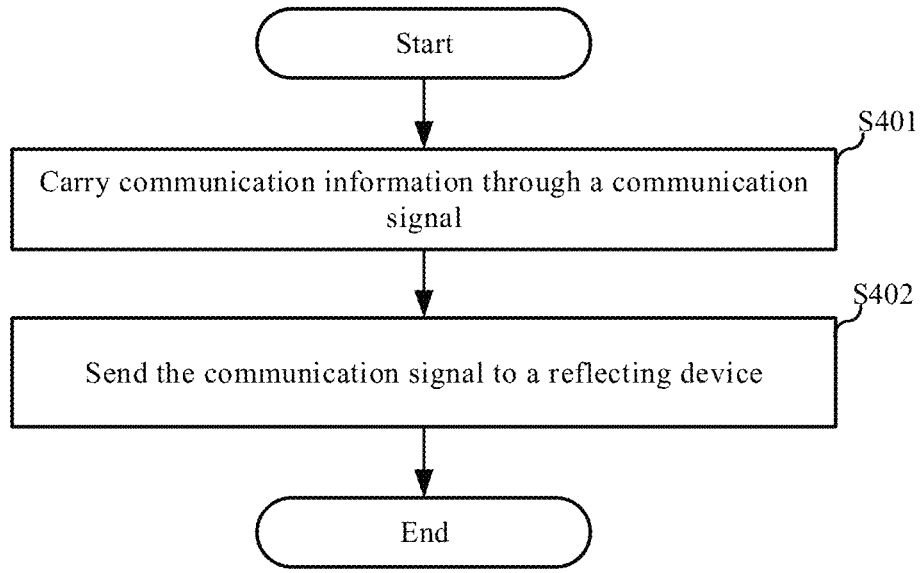
FIG. 4 shows a schematic flowchart of an information transmission method according to the present application.

A second aspect of the present application provides an information transmission method. FIG. 4 shows a schematic flowchart of an information transmission method according to the present application. The information transmission method may be applied to a base station. As shown in FIG. 4, the information transmission method of the present application may include the following operations S401 and S402.

At operation S401, communication information is carried through a communication signal.

The control information is information configured to adjust a reflection weight of a beam corresponding to a target transmission channel, and the target transmission channel is a transmission channel between the reflecting device and the airborne terminal.

At operation S402, the communication signal is sent to a reflecting device.

Upon receiving the communication signal, the reflecting device reflects, according to a reflection weight of the reflecting device, the communication signal to an airborne terminal by means of a beam corresponding to the reflection weight. The reflection weight is a reflection weight of a beam corresponding to a target transmission channel, and the target transmission channel is a transmission channel between the reflecting device and the airborne terminal.

In an exemplary implementation, before sending the communication signal to the reflecting device, the method further includes: acquiring control information, where the control information is configured to adjust a reflection weight of a beam corresponding to a target transmission channel, and the target transmission channel is a transmission channel between the reflecting device and the airborne terminal; and transmitting the control information to the reflecting device.

The reflecting device may adjust the reflection weight of the beam corresponding to the target transmission channel between the reflecting device and the airborne terminal, so as to ensure that the angle of the beam corresponding to the target transmission channel meets the transmission requirement (for example, the angle of the beam corresponding to the target transmission channel may accurately correspond to the airborne terminal so that the airborne terminal can accurately receive the communication information sent from the reflecting device), and improve the transmission accuracy of the communication information.

In the present application, by transmitting the obtained control information and communication information to the reflecting device, the reflecting device adjusts, according to the control information, the reflection weight of the beam corresponding to the target transmission channel, so that the reflecting device can transmit the communication information to the airborne terminal rapidly and accurately through the target transmission channel, and the airborne terminal can be guaranteed to receive the communication information accurately. A reflecting device is added between the base station and the airborne terminal, which increases the communication paths between the base station and the airborne terminal as well as the number of concurrent data streams sent to the airborne terminal from the base station, enables the air coverage radio communication system to support multi-stream transmission, and improves the communication rate of the terminal.

In an exemplary implementation, acquiring the control information includes: acquiring location information of the reflecting device and location information of the airborne terminal; and determining the control information according to the location information of the airborne terminal and the location information of the reflecting device.

The location information of the airborne terminal and the location information of the reflecting device may be represented by longitude and latitude information, so that the relative positions of the airborne terminal and the reflecting device can be accurately represented, and thereby the control information can be determined based on the relative positions, the reflecting device can be guaranteed to accurately adjust, according to the control information, the target transmission channel between the reflecting device and the airborne terminal, and the transmission accuracy of the communication information is improved.

In an exemplary implementation, before transmitting the control information to the reflecting device, the method further includes: acquiring location information of the base station; and determining, according to the location information of the base station and the location information of the reflecting device, an angle of a beam corresponding to a first transmission channel.

The first transmission channel is a line of sight path transmission channel between the reflecting device and the base station. With the first transmission channel, the reflecting device can be ensured to obtain the control information sent from the base station more rapidly and accurately, thereby ensuring the accuracy of the control information.

It should be noted that the line of sight path transmission channel is a transmission channel determined based on an LOS path. The base station can accurately send the communication information or control information to the reflecting device through the first transmission channel, so that the reflecting device can adjust the angle of the beam corresponding to the target transmission channel between the reflecting device and the airborne terminal according to the control information, thereby implementing accuracy control of the reflecting device by the base station.

In an exemplary implementation, the first transmission channel includes: a transmission channel based on channel state information, and/or a transmission channel based on a synchronization signal and PBCH block.

The synchronization signal and PBCH block (SSB) includes: a primary synchronization signal (PSS), a secondary synchronization signal (SSS), and a physical broadcast channel (PBCH). The PSS or SSS may be flexibly configured at any position of a carrier, and is not necessary to be configured at a central frequency point of the carrier, so as to implement flexible configuration of the carrier.

The channel state information is used to characterize channel properties of a communication link. The channel state information includes: a fading factor of the communication signal on each transmission channel. The base station enables the terminal to obtain more accurate channel estimation through a channel state information-reference signal (CSI-RS) port and a reflecting device to which the transmission beam is directed.

In an exemplary implementation, the target transmission channel includes: a channel determined based on a first beam of the airborne terminal, or a channel determined based on a second beam of the airborne terminal, where the first beam has a beam width smaller than the second beam.

The beam width includes: a horizontal beam width and/or a vertical beam width. The preset width threshold includes: a half power beam width.

By taking the channel determined based on the first beam of the airborne terminal, or the channel determined based on the second beam of the airborne terminal as the target transmission channel, and transmitting the communication information between the airborne terminal and the base station through the target transmission channel, the number of concurrent data streams between the airborne terminal and the base station can be increased, the air coverage radio communication system can support multi-stream transmission, and the communication rate of the terminal is improved.

In an exemplary implementation, after transmitting the control information to the reflecting device, the method further includes: processing, under the condition that the target transmission channel is determined based on the second beam of the airborne terminal, information transmitted through the target transmission channel based on a maximum ratio combining principle to obtain response information. The response information is response information fed back by the airborne terminal for the communication information and forwarded by the reflecting device.

The maximum ratio combining principle means that the base station determines a weight corresponding to each received signal according to a strength of the received signal, and performs weighted combination on respective received signals so that the processed received signals are clearer, and more complete response information can be obtained through the processed received signal.

For example, the second beam may be a beam corresponding to an omnidirectional antenna, and transmission energy of the omnidirectional antenna may act not only on an LOS path between the airborne terminal and the base station, but also on an NLOS path between the airborne terminal and other reflecting devices. In this case, the base station may process the information transmitted through the target transmission channel according to an amount of the reflection energy corresponding to each reflecting device based on the maximum ratio combining principle, so that more complete response information sent from the airborne terminal is obtained.

Figure 5:
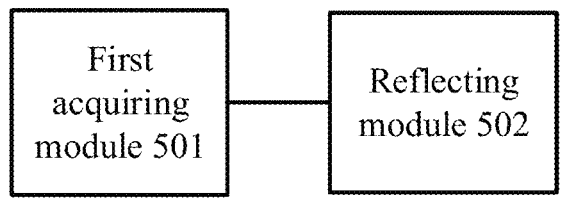
FIG. 5 shows a block diagram of a reflecting device according to the present application.

A third aspect of the present application provides a reflecting device. FIG. 5 shows a block diagram of a reflecting device according to the present application. As shown in FIG. 5, the reflecting device includes: a first acquiring module 501 configured to acquire communication information sent from a base station, where the communication information is carried by means of a communication signal; and a reflecting module 502 configured to reflect, according to a reflection weight of the reflecting device, the communication signal to an airborne terminal by means of a beam corresponding to the reflection weight.

In the present application, by acquiring the control information and the communication information sent from the base station through the first acquiring module, and adjusting, according to the control information, the angle of the beam corresponding to the target transmission channel through the adjusting module, the communication information transmitted through the target transmission channel can be ensured to reach the airborne terminal smoothly, and the channel quality of air coverage is improved. The first transmission module is used for transmitting the communication information to the airborne terminal through the target transmission channel, and the target transmission channel is added based on a conventional transmission channel between a base station and an airborne terminal, which increases the number of concurrent data streams sent to the airborne terminal from the base station, enables the air coverage radio communication system to support multi-stream transmission, and improves the communication rate of the terminal.

Figure 6:
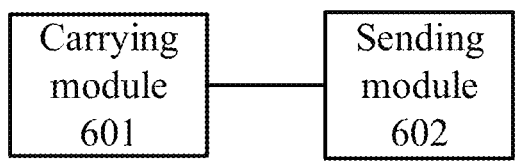
FIG. 6 shows a block diagram of a base station according to the present application.

A fourth aspect of the present application provides a base station. FIG. 6 shows a block diagram of a base station according to the present application. As shown in FIG. 6, the base station includes: a carrying module 601 configured to carry communication information through a communication signal; and a sending module 602 configured to send the communication signal to a reflecting device so that the reflecting device reflects, according to a reflection weight of the reflecting device, the communication signal to the airborne terminal through a beam corresponding to the reflection weight.

In the present application, by acquiring the control information for adjusting the angle of the beam corresponding to the target transmission channel and the communication information through the second acquisition module, and then transmitting the control information and the communication information to the reflecting device through the second transmission module, the transmission channel between the reflecting device and the airborne terminal can be more accurate, the communication information transmitted through a target transmission channel can be ensured to reach the airborne terminal smoothly, and the channel quality of air coverage is improved; and a target transmission channel is added based on a conventional transmission channel between a base station and an airborne terminal, which increases the number of concurrent data streams sent to the airborne terminal from the base station, enables the air coverage radio communication system to support multi-stream transmission, and improves the communication rate of the terminal.

Figure 7:
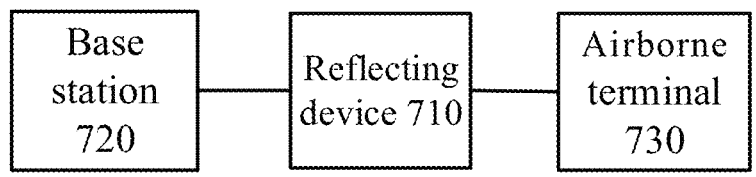
FIG. 7 shows a block diagram of an information transmission system according to the present application.

A fifth aspect of the present application provides an information transmission system. FIG. 7 shows a block diagram of an information transmission system according to the present application. As shown in FIG. 7, the information transmission system includes: a reflecting device 710 configured to perform the information transmission method according to the first aspect; a base station 720 configured to perform the information transmission method according to the second aspect; and an airborne terminal 730 configured to acquire communication information sent from the base station 720, generate response information according to the communication information, and transmit the response information to the reflecting device 710 through a target transmission channel so that the reflecting device 710 transmits the response information to the base station 720.

The reflecting device may be an active device configured to perform the information transmission method according to the first aspect; or may be a passive device configured to forward the received communication information sent from the base station 720 to the airborne terminal 730 according to different reflection weights. The airborne terminal 730 may be a terminal supported by an aircraft, a drone, or any other air coverage system. The base station 720 may be a terrestrial base station.

The base station 720 sends control information to the reflecting device 710 through a port corresponding to the CSI-RS, so that the reflecting device 710 adjusts, according to the control information, an angle of a beam directed to the reflecting device 710, and the reflecting device 710 can accurately forward the communication information sent from the base station to the airborne terminal 730. The airborne terminal 730 is guaranteed to acquire more accurate information such as channel estimation, channel quality indicator (CQI), rank indication (RI), precoding matrix indicator (PMI) and the like.

The CQI is used to measure and reflect the channel quality of a physical downlink shared channel (PDSCH). For example, the channel quality of the PDSCH is represented by 0 to 15, where 0 indicates the worst channel quality and 15 indicates the best channel quality. If the PDSCH has a good channel quality, the base station 720 may transmit more data to the airborne terminal 730; and otherwise, if the PDSCH has a poor channel quality, the base station 720 may transmit merely a few data to the airborne terminal 730. The RI is used to indicate the number of valid data layers of the PDSCH. Through the RI reported by the airborne terminal 730, the base station 720 may learn the number of code words (CWs) supported by the airborne terminal 730. For example, when RI is equal to 1, it means that the airborne terminal 730 can support one CW; and when RI is greater than 1, it means that the airborne terminal 730 can support two CWs. The PMI is used to indicate an index of a codebook set. Through the PMI reported by the airborne terminal 730, it can be determined whether the communication signal transmitted by the PDSCH is an optimal signal.

The control information includes location information of the airborne terminal 730 and/or angle adjustment information of a beam corresponding to a first transmission channel, where the first transmission channel is a no line of sight path transmission channel between the reflecting device 710 and the base station 730. The communication information includes at least one of broadcast information, channel state information, downlink control information, or downlink service information. The downlink control information is configuration information corresponding to downlink service information, and is used for configuration and adjustment of different pieces of service data.

In an exemplary implementation, after the reflecting device 710 obtains the location information of the airborne terminal 730, the angle of the beam corresponding to the target transmission channel between the reflecting device 710 and the airborne terminal 730 can be determined from the location information of the reflecting device 710 and the location information of the airborne terminal 730, and then based on this angle, the angle of the beam corresponding to the target transmission channel is adjusted. Therefore, the airborne terminal 730 can accurately receive the communication information forwarded by the reflecting device 710, and the signal quality of the air coverage is improved.

It should be noted that an uplink channel (a channel transmitted by the airborne terminal 730 to the base station 720 through a different transmission channel) in the information transmission system may correspond to different transmission channels according to different types of transmitting antennas used in the airborne terminal 730.

According to the information transmission system of the present application, by deploying the reflecting device between the base station (and/or a radio frequency device) and the airborne terminal, a target transmission channel is added based on a conventional transmission channel between a base station and an airborne terminal, which increases the number of concurrent data streams sent to the airborne terminal from the base station, enables the air coverage radio communication system to support multi-stream transmission, and improves the communication rate of the terminal.

Figure 8:
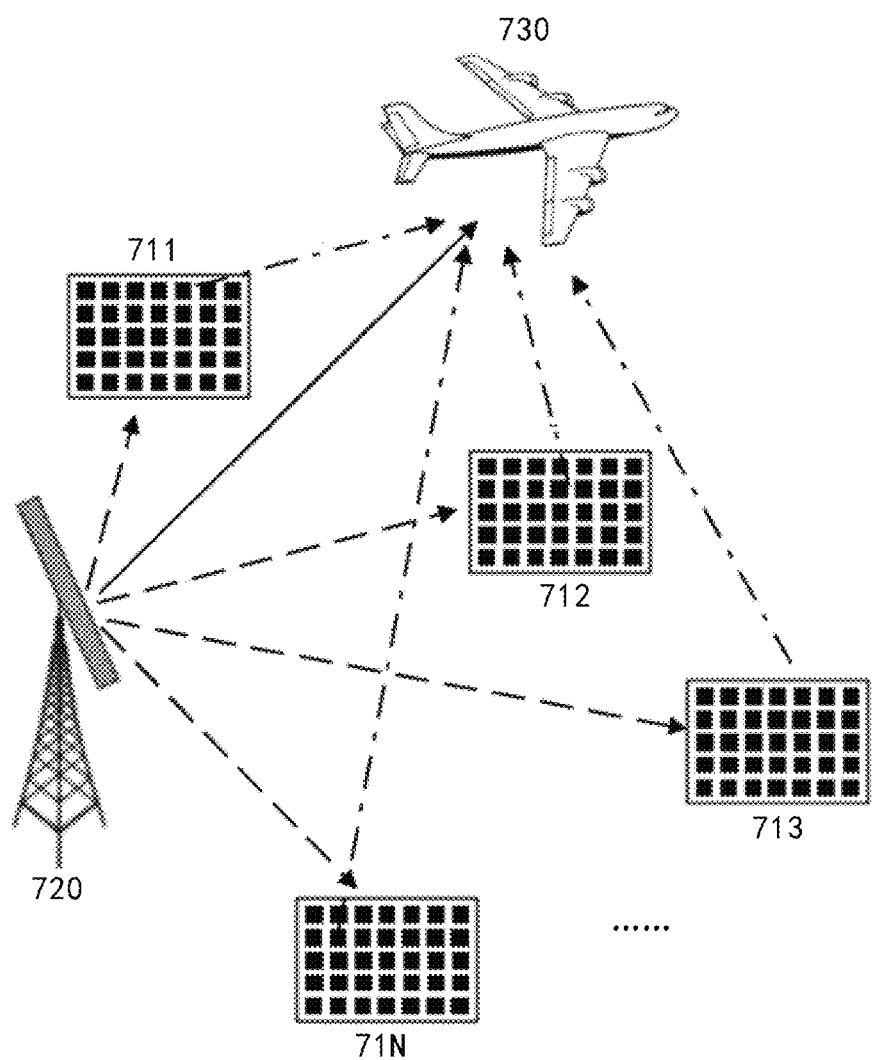
FIG. 8 shows a schematic flowchart of transmission of downlink information in an information transmission system according to the present application.

FIG. 8 shows a schematic flowchart of transmission of downlink information in an information transmission system according to the present application. As shown in FIG. 8, the information transmission system may include a plurality of reflecting devices. For example, the information transmission system includes: a first reflecting device 711, a second reflecting device 712, a third reflecting devices 713, . . . , and an $N^{th}$ reflecting device 71N, where N is an integer greater than or equal to 1.

As shown in FIG. 8, the downlink transmission channel in the information transmission system is a transmission channel for transmitting the communication information from the base station 720 to the airborne terminal 730. The downlink transmission channel includes: 0) a $0^{th}$ downlink channel: base station 720→airborne terminal 730; 1) a $1^{st}$ downlink channel: base station 720→first reflecting device 711→airborne terminal 730; 2) a $2^{nd}$ downlink channel: base station 720→second reflecting device 712→airborne terminal 730; 3) a $3^{rd}$ downlink channel: base station 720→third reflecting device 713→airborne terminal 730; . . . ; N) an $N^{th}$ downlink channel: base station 720→$N^{th}$ reflecting device 71N→airborne terminal 730.

It should be noted that the N reflecting devices may include both active devices and passive devices. The passive device refers to a reflecting device that cannot automatically adjust the reflection weight between the reflecting device and the airborne terminal 730. In installation, an installation position of the passive reflecting device is a position determined by preset network planning parameters, and includes at least one of installation angle information, installation height information or distance information between the passive reflecting device and the base station 720. In this case, the passive reflecting device may adopt a beam (i.e., a wide beam) with a beam width greater than or equal to a preset width threshold, so that the probability of the airborne terminal 730 receiving the communication information is increased.

The beam width includes: a horizontal beam width and a vertical beam width. The horizontal beam width indicates an angle between two directions, in which radiation powers are each reduced by 3 dB, on both sides of the maximum radiation direction in the horizontal direction. The vertical beam width indicates an angle between two directions, in which radiation powers are each reduced by 3 dB, on both sides of the maximum radiation direction in the vertical direction. The preset width threshold includes a half power beam width.

The active device refers to a reflecting device that can automatically adjust the reflection weight of the beam corresponding to the target transmission channel between the reflecting device and the airborne terminal 730 according to the control information sent from the base station 720, so that the communication information forwarded by the reflecting device can smoothly reach the airborne terminal 730, and the signal quality of the airborne terminal 730 is improved.

In an exemplary implementation, the base station 720 generates a beam with a fixed transmission angle, so that the angle of the beam corresponds to reflecting devices around the beam, and the control information and the communication information sent from the base station 720 can be accurately transmitted to each reflecting device.

The downlink information forwarded by each reflecting device to the airborne terminal 730 includes merely communication information, but not control information sent from the base station 720 to each reflecting device. Meanwhile, the airborne terminal 730 receives the communication information sent from the base station 720 through a plurality of different downlink transmission channels.

In an exemplary implementation, the base station 720 may obtain, through a global positioning system (GPS), the location information of the airborne terminal 730 and the location information of each reflecting device, and thereby determine an angle corresponding to a beam of a target transmission channel between each reflecting device and the airborne terminal 730 according to the above location information.

In an exemplary implementation, a plurality of reflecting units to be used are included. The reflecting device may select, according to the location information of the airborne terminal 730 and the location information of the reflecting device, a target reflecting unit from the plurality of reflecting units to be used, and determine a reflection weight corresponding to the target reflecting unit; and determine, according to the reflection weight corresponding to the target reflecting unit (or the reflection weight of the target reflecting unit), an angle of a beam corresponding to a target transmission channel between the reflecting device and the airborne terminal 730.

Figure 9:
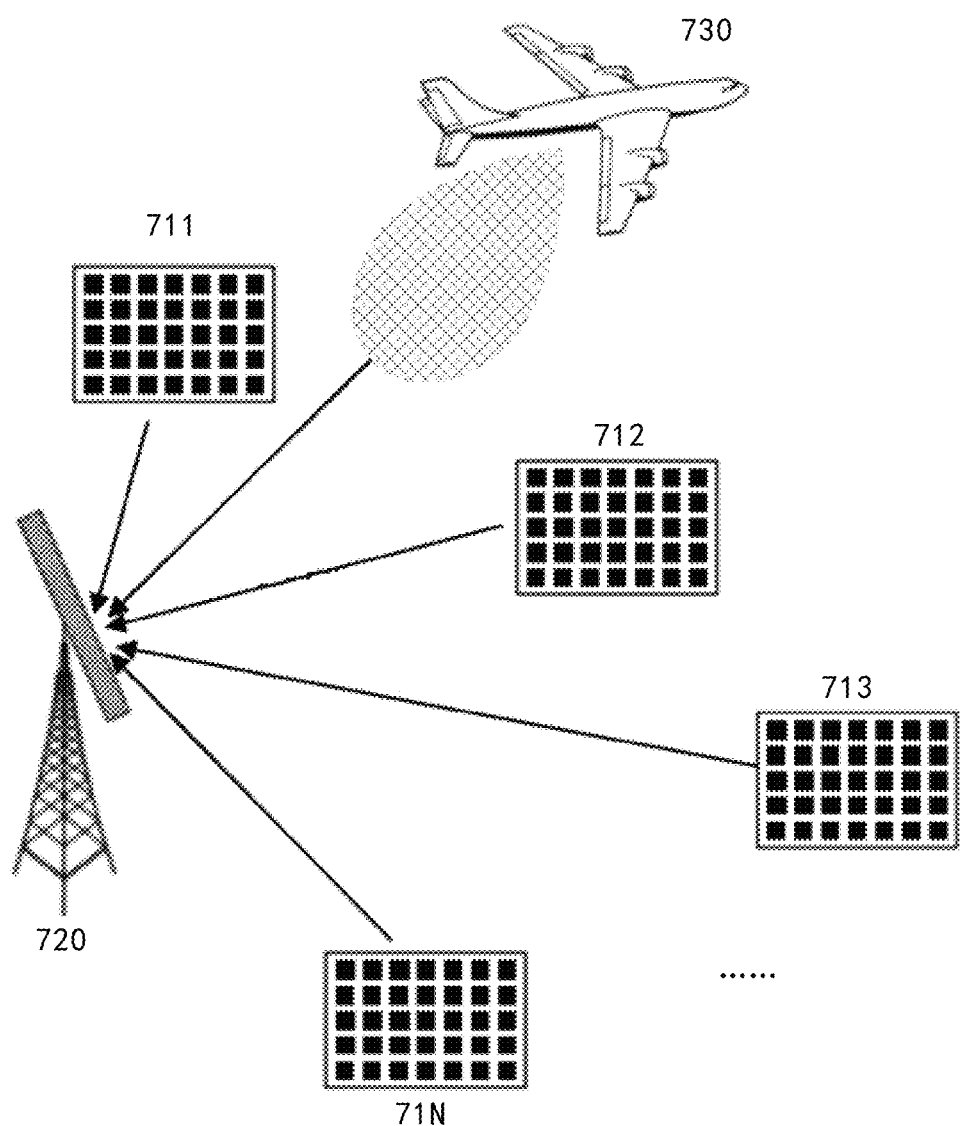
FIG. 9 shows a schematic flowchart of transmission of uplink information through an omnidirectional antenna in an information transmission system according to the present application.
Figure 10:
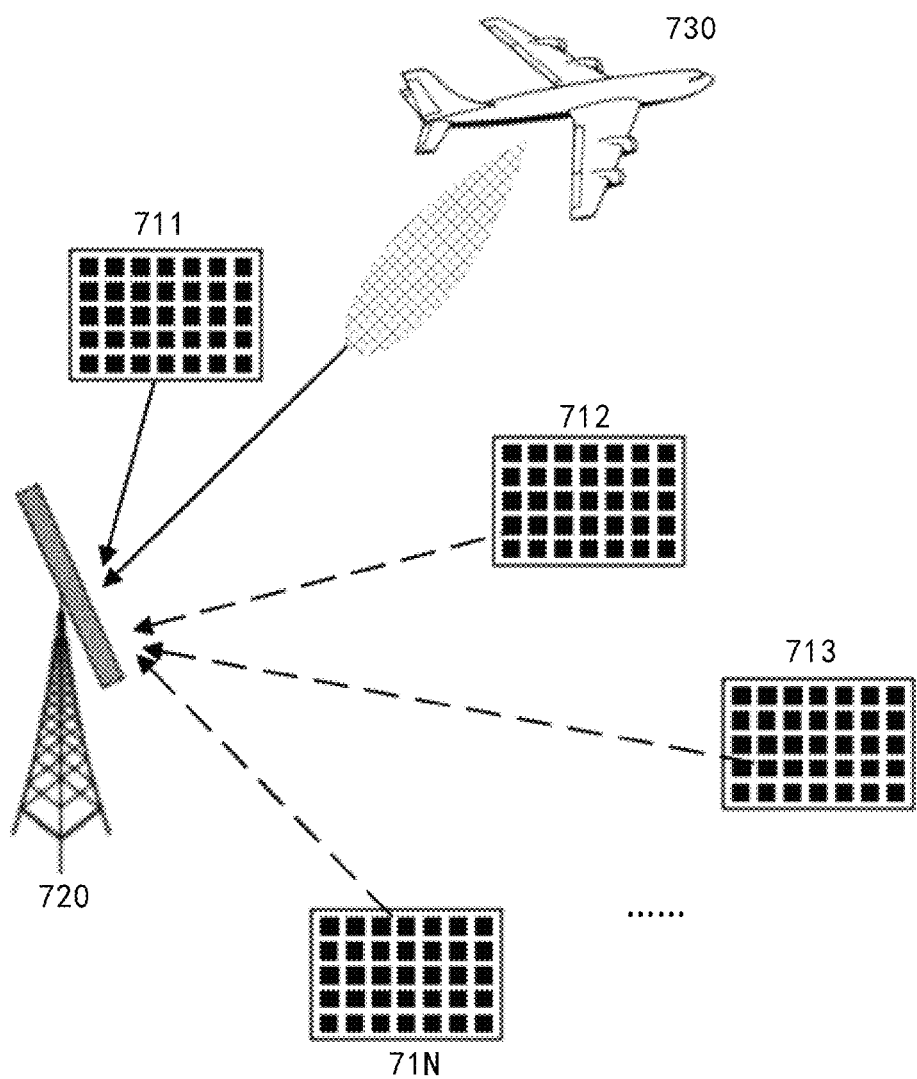
FIG. 10 shows a schematic flowchart of transmission of uplink information through a directional antenna in an information transmission system according to the present application.

In an exemplary implementation, the antenna used by the airborne terminal 730 in the information transmission system may be an omnidirectional antenna, or a directional antenna with an adjustable direction. FIG. 9 shows a schematic flowchart of transmission of uplink information through an omnidirectional antenna in an information transmission system according to the present application. FIG. 10 shows a schematic flowchart of transmission of uplink information through a directional antenna in an information transmission system according to the present application.

As shown in FIG. 9 or FIG. 10, the uplink transmission channel in the information transmission system is a transmission channel for transmitting the communication information from the airborne terminal 730 to the base station 720. The uplink transmission channel includes: 0) a $0^{th}$ uplink channel: airborne terminal 730→base station 720; 1) a $1^{st}$ uplink channel: airborne terminal 730→first reflecting device 711→base station 720; 2) a $2^{nd}$ uplink channel: airborne terminal 730→second reflecting device 712→base station 720; 3) a $3^{rd}$ uplink channel: airborne terminal 730→third reflecting device 713→base station 720; ... ; N) an $N^{th}$ uplink channel: airborne terminal 730→$N^{th}$ reflecting device 71N→base station 720.

As shown in FIG. 9, the antenna used by the airborne terminal 730 is an omnidirectional antenna corresponding to a wide beam (i.e., the beam corresponding to the omnidirectional antenna has a beam width greater than or equal to the preset width threshold). The transmit energy of the omnidirectional antenna may act not only on an LOS path between the airborne terminal 730 and the base station 720, but also on an NLOS path between the airborne terminal 730 and other reflecting devices (i.e., there are a plurality of reflecting devices between the airborne terminal 730 and the base station 720, which block communication signals between the airborne terminal 730 and the base station 720). In this case, the base station 720 may process the received signal according to an amount of the reflection energy corresponding to each reflecting device based on the maximum ratio combining principle, so that more complete communication information sent from the airborne terminal 730 is obtained.

The maximum ratio combining principle means determining a weight corresponding to each received signal according to a strength of the received signal, and performing weighted combination on respective received signals so that the processed received signals are clearer, and more complete communication information can be obtained through the processed received signal.

As shown in FIG. 10, the antenna used by the airborne terminal 730 is a directional antenna with an adjustable direction and corresponding to a narrow beam (i.e., the beam corresponding to the directional antenna has a beam width less than the preset width threshold). The main transmission energy of the directional antenna acts on an LOS path between the airborne terminal 730 and the base station 720 so that the uplink communication information sent from the airborne terminal 730 can reach the base station 720 more accurately.

By using the omnidirectional antenna or the directional antenna with an adjustable direction as the antenna of the airborne terminal 730, the number of concurrent data streams between the airborne terminal 730 and the base station 720 is increased, and the communication rate of the terminal is improved.

Figure 11:
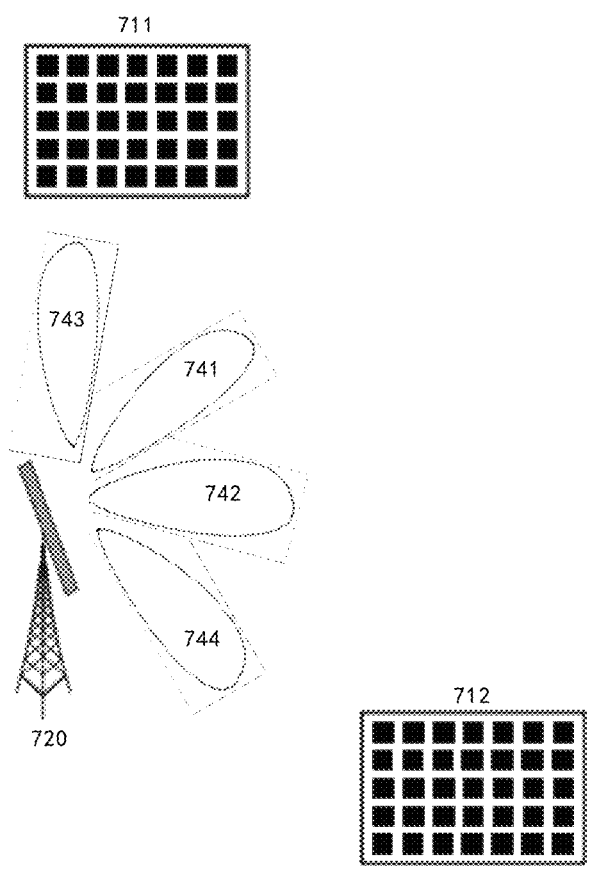
FIG. 11 shows a schematic flowchart of transmission of a downlink communication signal through a transmission channel based on a synchronization signal and PBCH block in an information transmission system according to the present application.

In an exemplary implementation, the base station 720 in the information transmission system may employ a transmission channel based on a synchronization signal and PBCH block for transmission of downlink communication signals. FIG. 11 shows a schematic flowchart of transmission of a downlink communication signal through a transmission channel based on a synchronization signal and PBCH block in an information transmission system according to the present application.

As shown in FIG. 11, the information transmission system is a 5G based time division dual (TDD) air coverage radio communication system. The base station 720 corresponds to two reflecting devices (i.e., a first reflecting device 711 and a second reflecting device 712), each of which is an active device. The beam transmitted by the base station 720 includes: a first single sideband modulation beam 741, a second single sideband modulation beam 742, a third single sideband modulation beam 743, and a fourth single sideband modulation beam 744. The third single sideband modulation beam 743 corresponds to the first reflecting device 711, and the fourth single sideband modulation beam 744 corresponds to the second reflecting device 712.

Figure 12:
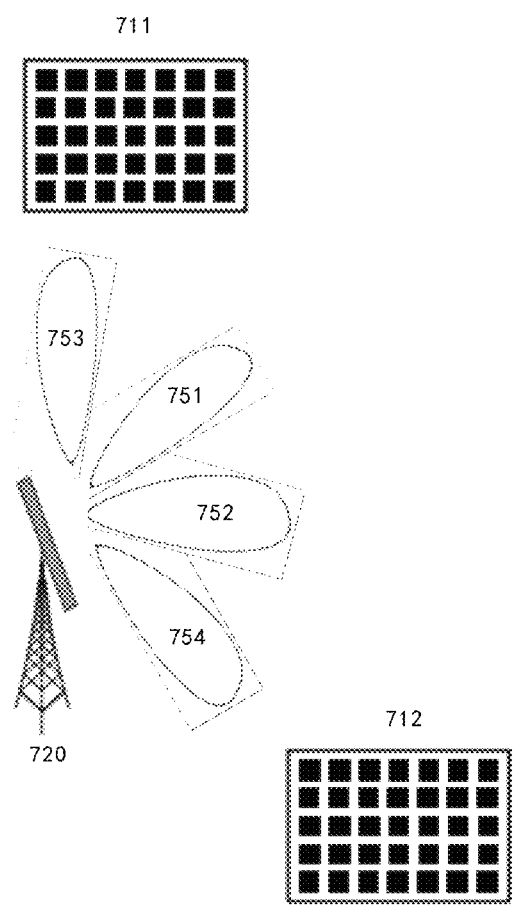
FIG. 12 shows a schematic flowchart of transmission of a downlink communication signal based on channel state information in an information transmission system according to the present application.

In an exemplary implementation, the base station 720 in the information transmission system may implement transmission of downlink communication signals based on channel state information. FIG. 12 shows a schematic flowchart of transmission of a downlink communication signal based on channel state information in an information transmission system according to the present application.

The channel state information is used to characterize channel properties of a communication link. The channel state information includes: a fading factor of the communication signal on each transmission channel, such as at least one of signal scattering information, environment fading (multipath fading or shadowing fading) information, or power decay of distance information.

In a multi-antenna system, the base station 720 may transmit multiple beams. As shown in FIG. 12, the beams transmitted by the base station 720 include: a first channel state beam 751, a second channel state beam 752, a third channel state beam 753, and a fourth channel state beam 754. With the channel state information transmitted through each channel state beam, the reliability of communication can be ensured.

The base station 720 enables different transmission beams to be directed to different reflecting devices based on a port corresponding to a channel state information-reference signal (CSI-RS). For example, the third channel state beam 753 corresponds to the first reflecting device 711, or the fourth channel state beam 754 corresponds to the second reflecting device 712, so on and so forth, so that the terminal can obtain more accurate channel estimation.

Figure 13:
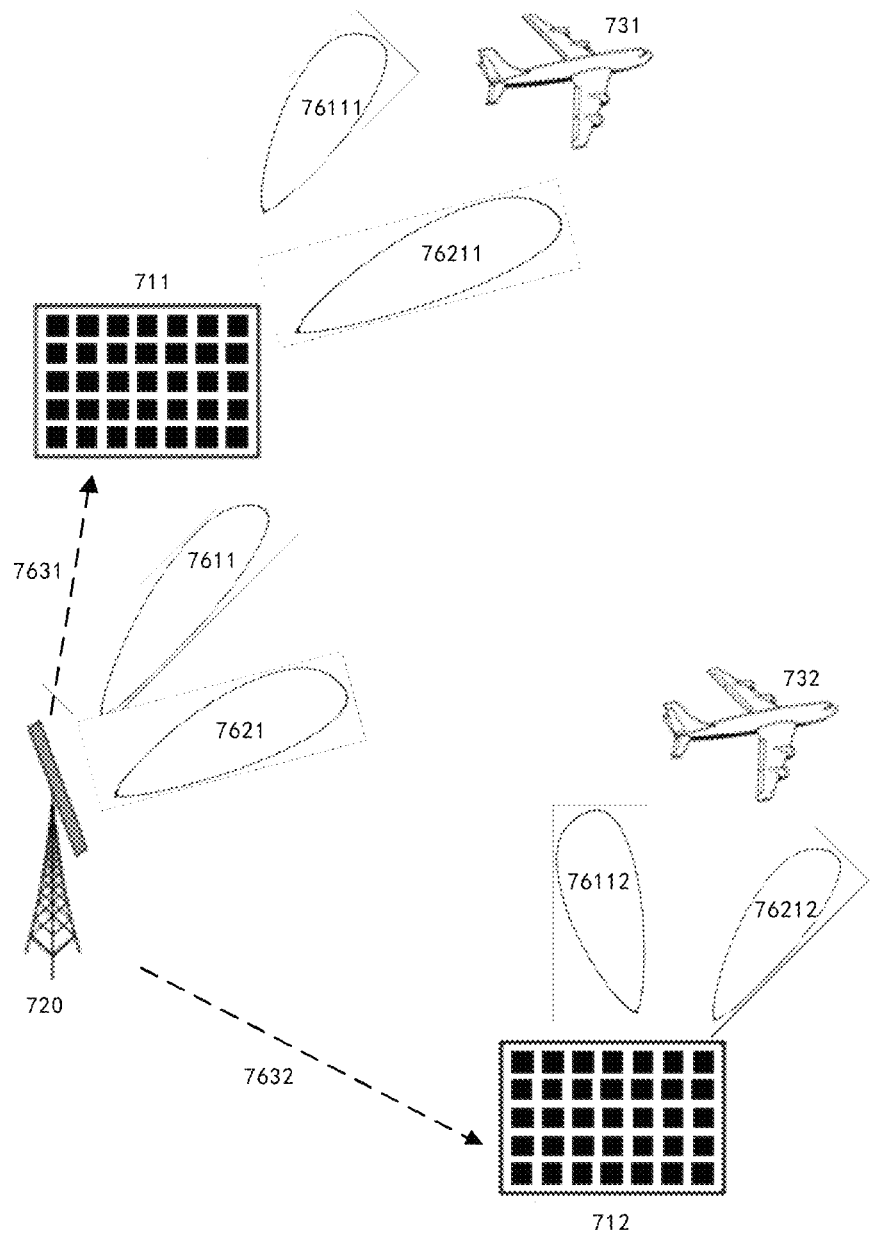
FIG. 13 shows a schematic flowchart of transmission of downlink information based on an active RIS in an information transmission system according to the present application.

FIG. 13 shows a schematic flowchart of transmission of downlink information based on an active RIS in an information transmission system according to the present application. As shown in FIG. 13, the base station 720 performs downlink communication with the first airborne terminal 731 and the second airborne terminal 732 as follows.

First, the base station 720 sends a first control signal 7631 to the first reflecting device 711, so that the first reflecting device 711 adjusts a transmission angle relative to the first airborne terminal 731 according to the first control signal 7631. At the same time, the base station 720 sends a second control signal 7632 to the second reflecting device 712, so that the second reflecting device 712 adjusts a transmission angle relative to the second airborne terminal 732 according to the second control signal 7632.

In an exemplary implementation, the base station 720 may transmit the first control signal 7631 and/or the second control signal 7632 over a communication channel in a WIFI or 4G communication network.

Second, in a TDD communication manner, the base station 720 transmits first downlink communication information at a first time point with a time division multiplexing beam 7611 at the first time point; and transmits second downlink communication information at a second time point with a time division multiplexing beam 7621 at the second time point.

Upon receiving the first downlink communication information, the first reflecting device 711 forwards the first downlink communication information to the first airborne terminal 731 with a time division multiplexing forwarding beam 76111 at the first time point; and upon receiving the second downlink communication information, the first reflecting device 711 forwards the second downlink communication information to the first airborne terminal 731 with a time division multiplexing forwarding beam 76211 at the second time point.

Upon receiving the first downlink communication information, the second reflecting device 712 forwards the first downlink communication information to the second airborne terminal 732 with a time division multiplexing forwarding beam 76112 at the first time point; and upon receiving the second downlink communication information, the second reflecting device 712 forwards the second downlink communication information to the second airborne terminal 732 with a time division multiplexing forwarding beam 76212 at the second time point.

By forwarding different downlink communication information sent from the base station to the airborne terminal through the first reflecting device and the second reflecting device at different time points, the airborne terminal can receive the downlink communication information sent from the base station through a plurality of transmission channels, which can increase the number of concurrent data streams sent to the airborne terminal from the base station, enable the information transmission system to support multi-stream transmission, and improve the communication rate of the terminal.

Figure 14:
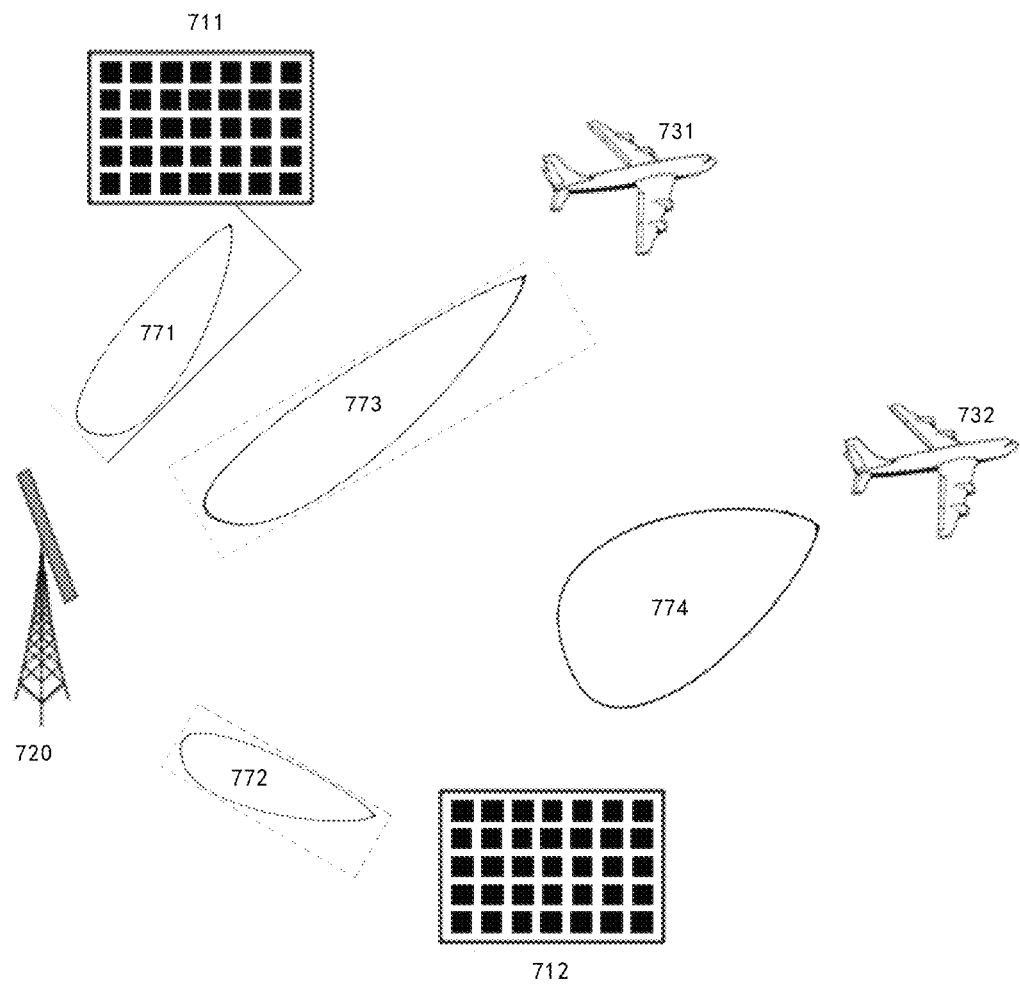
FIG. 14 shows a schematic flowchart of transmission of uplink information based on an active RIS in an information transmission system according to the present application.

FIG. 14 shows a schematic flowchart of transmission of uplink information based on an active RIS in an information transmission system according to the present application. As shown in FIG. 14, a third uplink feedback beam 773 used by the first airborne terminal 731 and a fourth uplink feedback beam 774 used by the second airborne terminal 732 may be beams corresponding to directional antennas (e.g., directional antennas with adjustable directions), or beams corresponding to non-directional antennas (e.g., omnidirectional antennas).

The beam corresponding to the directional antenna with an adjustable direction has a different beam width from the beam corresponding to the omnidirectional antenna. If the downlink transmission channel of a certain reflecting device is a channel determined based on the beam corresponding to a directional antenna with an adjustable direction, the uplink transmission channel of the reflecting device is also desired to be a channel determined based on the beam corresponding to a directional antenna with an adjustable direction. Similarly, if the downlink transmission channel of a certain reflecting device is a channel determined based on the beam corresponding to an omnidirectional antenna, the uplink transmission channel of the reflecting device is also desired to be a channel determined based on the beam corresponding to an omnidirectional antenna, so that the channel gain of the uplink transmission channel (e.g., fading of the uplink channel) is improved.

As shown in FIG. 14, the first airborne terminal 731 and the second airborne terminal 732 are in uplink communication with the base station 720 as follows.

The first airborne terminal 731 may send first uplink feedback information to the base station 720 through a third uplink feedback beam 773, or the first reflecting device 711 may forward the received first uplink feedback information sent from the first airborne terminal 731 to the base station 720 through a first uplink feedback beam 771. The base station 720 obtains the first uplink feedback information sent from the first airborne terminal 731 through a plurality of different transmission channels, so that the quality of the received signal is improved and the integrity and accuracy of the received first uplink feedback information is ensured.

Similarly, the second airborne terminal 732 may send second uplink feedback information to the base station 720 through a fourth uplink feedback beam 774, or the second reflecting device 712 may forward the received second uplink feedback information sent from the second airborne terminal 732 to the base station 720 through a second uplink feedback beam 772. The base station 720 obtains the second uplink feedback information sent from the second airborne terminal 732 through a plurality of different transmission channels, so that the quality of the received signal is improved and the integrity and accuracy of the received second uplink feedback information is ensured.

In an exemplary implementation, the information transmission system is a 4G based frequency division duplexing (FDD) air coverage radio communication system. The information transmission system includes: three passive reflecting devices (i.e., a third reflecting device 713, a fourth reflecting device 714, and a fifth reflecting device 715), a base station 720, a first airborne terminal 731, and a second airborne terminal 732.

Figure 15:
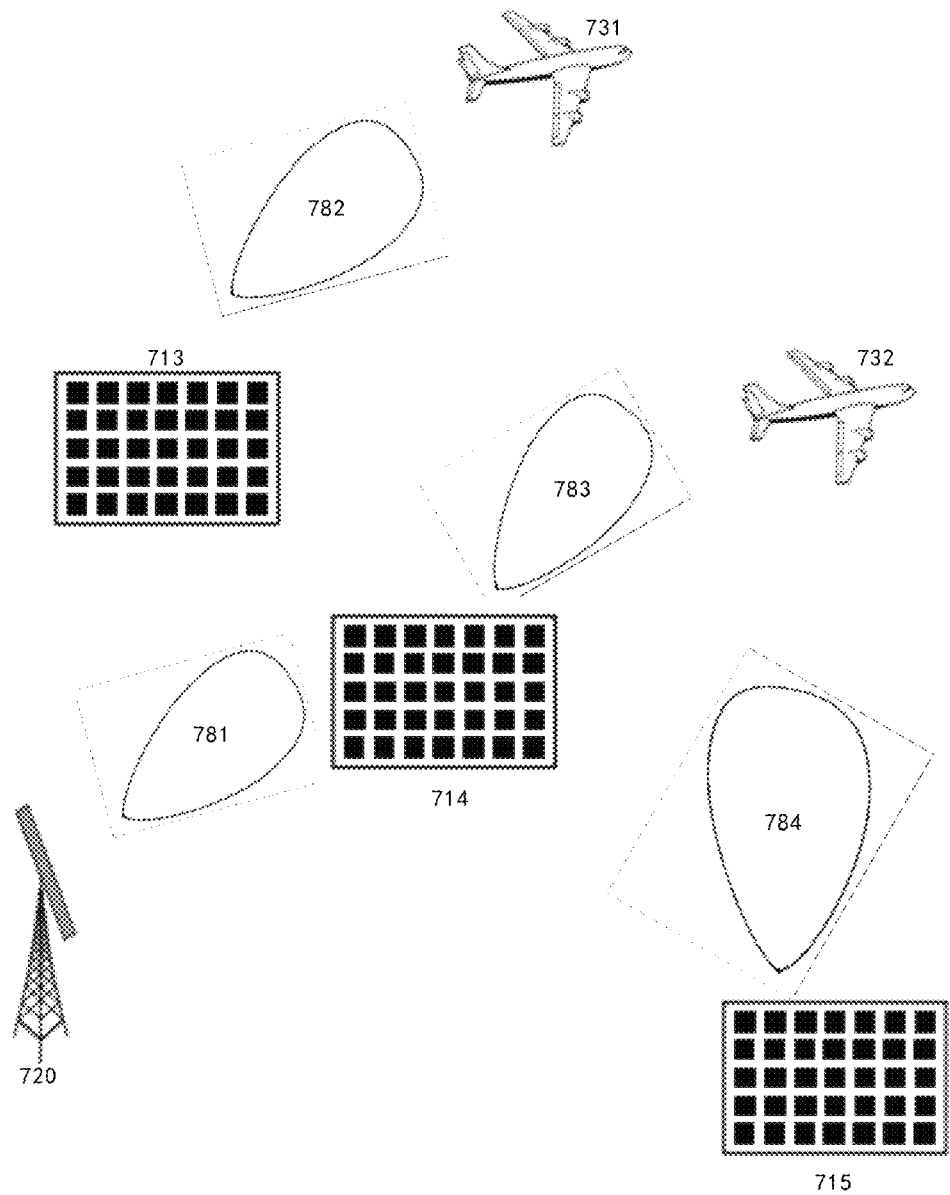
FIG. 15 shows a schematic flowchart of transmission of downlink information based on a passive RIS in an information transmission system according to the present application.

FIG. 15 shows a schematic flowchart of transmission of downlink information based on a passive RIS in an information transmission system according to the present application. As shown in FIG. 15, the base station 720 respectively corresponds to the third reflecting device 713, the fourth reflecting device 714, and the fifth reflecting device 715, each of which employs a beam (i.e., a wide beam) having a beam width greater than or equal to the preset width threshold.

The base station 720 uses a first downlink transmission beam 781 to transmit downlink information in a broadcast manner, so that the first airborne terminal 731 and the second airborne terminal 732 can obtain the downlink information. The downlink information includes synchronization information and/or downlink broadcast information, and the first downlink transmission beam is a beam corresponding to a physical downlink shared channel (PDSCH).

Upon determining that the third reflecting device 713 receives the downlink information sent from the base station 720, the third reflecting device 713 forwards the downlink information to the first airborne terminal 731 through a second downlink transmission beam 782; upon determining that the fourth reflecting device 714 receives the downlink information sent from the base station 720, the fourth reflecting device 714 forwards the downlink information to the second airborne terminal 732 through a third downlink transmission beam 783; and upon determining that the fifth reflecting device 715 receives the downlink information sent from the base station 720, the fifth reflecting device 715 forwards the downlink information to the second airborne terminal 732 through a fourth downlink transmission beam 784.

By forwarding the downlink information sent from the base station through a plurality of passive reflecting devices, the number of data streams received by the airborne terminal can be increased, so that the 4G based FDD air coverage radio communication system can support multi-stream transmission, and the communication rate of the terminal is improved.

Figure 16:
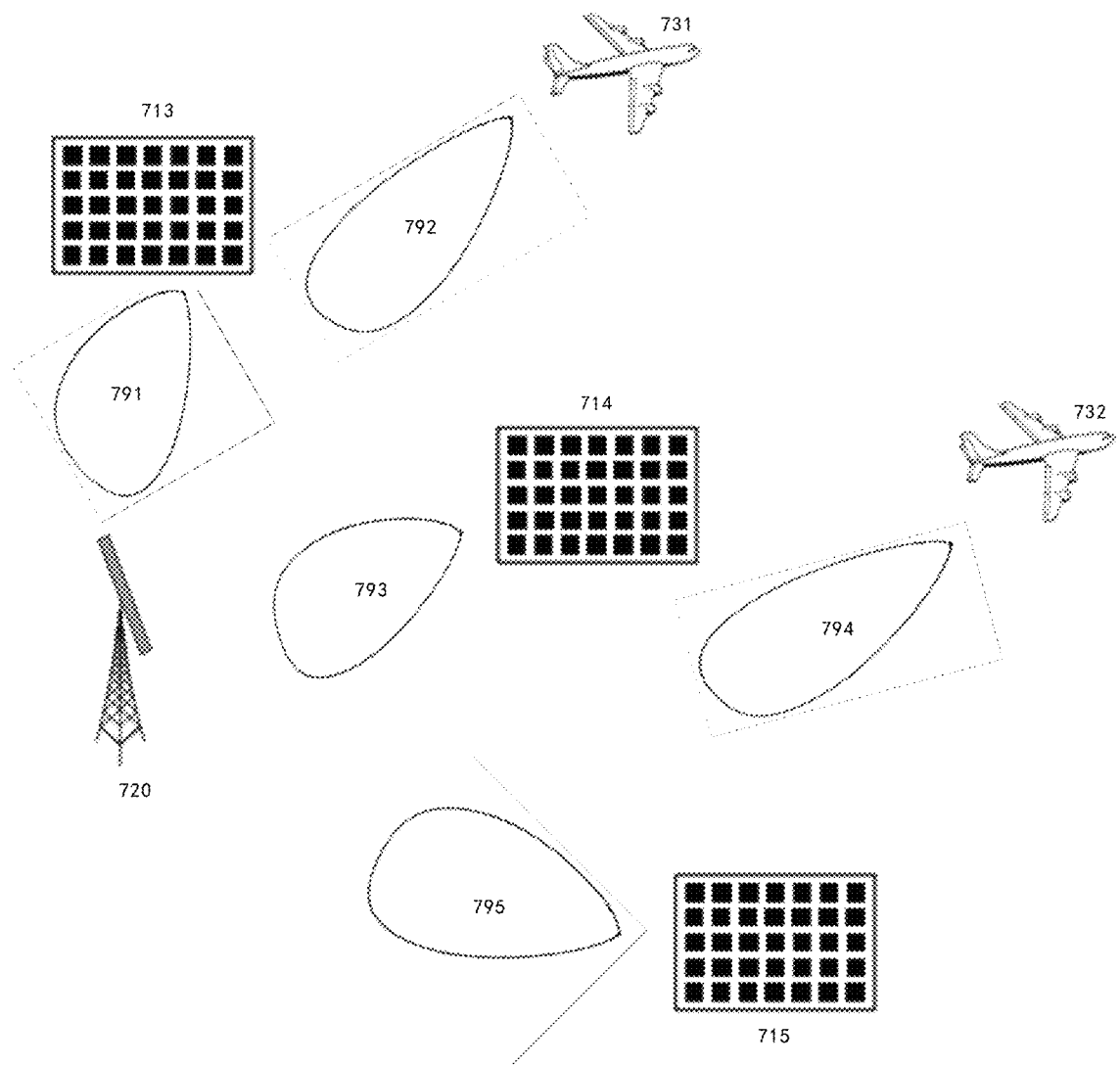
FIG. 16 shows a schematic flowchart of transmission of uplink information based on a passive RIS in an information transmission system according to the present application.

FIG. 16 shows a schematic flowchart of transmission of uplink information based on a passive RIS in an information transmission system according to the present application. Each airborne terminal may adopt a directional antenna with an adjustable direction, and each reflecting device may be a passive reflecting device with a beam (i.e., a wide beam) having a beam width greater than or equal to the preset width threshold.

As shown in FIG. 16, the first airborne terminal 731 transmits first uplink information to the base station 720 through a second uplink transmission beam 792, and the second airborne terminal 732 transmits second uplink information to the base station 720 through a fourth uplink transmission beam 794.

Upon determining that the third reflecting device 713 receives the first uplink information sent from the first airborne terminal 731, the third reflecting device 713 forwards the first uplink information to the base station 720 through a first uplink transmission beam 791. Therefore, the first uplink information received by the base station 720 is information obtained through two different transmission channels (i.e., the LOS path transmission channel between the first airborne terminal 731 and the base station 720, and the NLOS path transmission channel formed by the first airborne terminal 731, the third reflecting device 713, and the base station 720), which increases the number of data streams between the base station 720 and the first airborne terminal 731.

Upon determining that the fourth reflecting device 714 receives the second uplink information sent from the second airborne terminal 732, the fourth reflecting device 714 forwards the second uplink information to the base station 720 through a third uplink transmission beam 793. Upon determining that the fifth reflecting device 715 receives the second uplink information sent from the second airborne terminal 732, the fifth reflecting device 715 forwards the second uplink information to the base station 720 through a fifth uplink transmission beam 795.

Therefore, the second uplink information received by the base station 720 is information obtained through three different transmission channels (i.e., the LOS path transmission channel between the second airborne terminal 732 and the base station 720, the NLOS path transmission channel formed by the second airborne terminal 732, the fourth reflecting device 714 and the base station 720, and the NLOS path transmission channel formed by the second airborne terminal 732, the fifth reflecting device 715 and the base station 720), which increases the number of data streams between the base station 720 and the second airborne terminal 732, so that the channel gain of the uplink transmission channel (e.g., fading of the uplink channel) of the base station 720 is improved.

It should be noted that the present disclosure is not limited to the specific configurations and processing described in the above implementations and shown in the figures. For convenience and simplicity of description, detailed description of a known method is omitted here, and for the specific working processes of the system, the modules and the units described above, reference may be made to corresponding processes in the foregoing method implementations, which are not repeated here.

Figure 17:
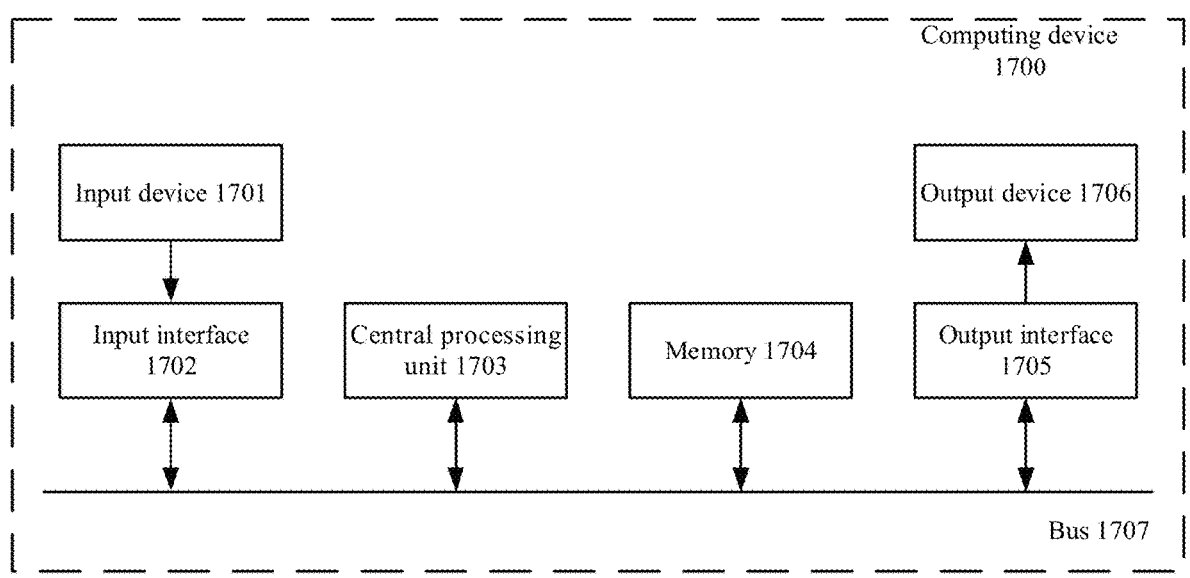
FIG. 17 shows a block diagram of an exemplary hardware architecture of a computing device capable of implementing the information transmission method and apparatus according to the present application.

FIG. 17 shows a block diagram of an exemplary hardware architecture of a computing device capable of implementing the information transmission method and apparatus according to the present application.

As shown in FIG. 17, the computing device 1700 includes an input device 1701, an input interface 1702, a central processing unit 1703, a memory 1704, an output interface 1705, and an output device 1706. The input interface 1702, the central processing unit 1703, the memory 1704, and the output interface 1705 are connected to each other via a bus 1707, and the input device 1701 and the output device 1706 are connected to the bus 1707 via the input interface 1702 and the output interface 1705, respectively, and further connected to other components of the computing device 1700.

Exemplarily, the input device 1701 receives input information from the outside, and transmits the input information to the central processing unit 1703 through the input interface 1702; the central processing unit 1703 processes the input information based on computer-executable instructions stored in the memory 1704 to generate output information, stores the output information temporarily or permanently in the memory 1704, and then transmits the output information to the output device 1706 through the output interface 1705; and the output device 1706 outputs output information outside of the computing device 1700 for use by a user.

In an implementation, the computing device shown in FIG. 17 may be implemented as an electronic device including: a memory configured to store a program; and a processor configured to execute the program stored in the memory to perform the information transmission method described in any of the above implementations.

In an implementation, the computing device shown in FIG. 17 may be implemented as an information transmission system including: a memory configured to store a program; and a processor configured to execute the program stored in the memory to perform the information transmission method described in any of the above implementations.

According to the information transmission method, the reflecting device, the electronic device and the corresponding readable storage medium of the present application, the communication signal is reflected to an airborne terminal by means of a beam corresponding to a reflection weight according to the reflection weight of the reflecting device, so that the communication information can be ensured to reach the airborne terminal smoothly, and the channel quality of air coverage is improved. A reflecting device is added based on a conventional transmission channel between a base station and an airborne terminal, which increases the communication paths between the base station and the airborne terminal as well as the number of concurrent data streams sent to the airborne terminal from the base station, enables the air coverage radio communication system to support multi-stream transmission, and improves the communication rate of the terminal.

According to the information transmission method, the base station, the electronic device and the corresponding readable storage medium of the present application, by sending a communication signal carrying communication information to a reflecting device, the reflecting device reflects, according to a reflection weight of the reflecting device, the communication signal to the airborne terminal through a beam corresponding to the reflection weight, so that the communication information can be ensured to reach the airborne terminal smoothly, and the channel quality of air coverage is improved. A reflecting device is added based on a conventional transmission channel between a base station and an airborne terminal, which increases the communication paths between the base station and the airborne terminal as well as the number of concurrent data streams sent to the airborne terminal from the base station, enables the air coverage radio communication system to support multi-stream transmission, and improves the communication rate of the terminal.

According to the information transmission system of the present application, a reflecting device is added between the base station and the airborne terminal, which can increase the communication paths between the base station and the airborne terminal as well as the number of concurrent data streams sent to the airborne terminal from the base station, so that the air coverage radio communication system can support multi-stream transmission, and the communication rate of the terminal is improved.

The above are merely exemplary implementations of the present application and not intended to limit the scope of the present application. In general, the various possible implementations of the present application may be implemented in hardware or dedicated circuits, software, logic or any combination thereof. For example, some aspects may be implemented in hardware, while other aspects may be implemented in firmware or software which may be executed by a controller, a microprocessor or any other computing device, although the present application is not limited thereto.

Implementations of the present application may be implemented by a data processor of a mobile device executing computer program instructions, for example, in a processor entity, or by hardware, or by a combination of software and hardware. The computer program instructions may be assembler instructions, instruction set architecture (ISA) instructions, machine instructions, machine-related instructions, microcodes, firmware instructions, state setting data, or source or object codes written in any combination of one or more programming languages.

The block diagrams of any logic flow in the figures of the present application may represent program operations, or may represent interconnected logic circuits, modules, and functions, or may represent a combination of program operations and logic circuits, modules, and functions. The computer program may be stored on a memory. The memory may be of any type suitable to the local technical environment and may be implemented in any suitable data storage technology, such as but not limited to, read only memories (ROMs), random access memories (RAMs), optical storage devices or systems (digital versatile discs (DVDs), compact discs (CDs)), etc. The computer-readable medium may include a non-transitory storage medium. The data processor may be of any type suitable to the local technical environment, such as but not limited to, general purpose computers, dedicated computers, microprocessors, digital signal processors (DSPs), application specific integrated circuits (ASICs), field programmable gate arrays (FGPAs), and processors based on multi-core processor architecture.

The foregoing has provided by way of exemplary and non-limiting examples a detailed description of exemplary implementations of the present application. Various modifications and adaptations to the foregoing implementations may become apparent to those skilled in the art in view of the accompanying drawings and the appended claims, without departing from the scope of the present disclosure. Accordingly, the proper scope of the present application is to be determined according to the claims.

What is claimed is:

1. An information transmission method applied to a reflecting device, comprising:
acquiring communication information sent from a base station, wherein the communication information is carried by means of a communication signal; and
reflecting, according to a reflection weight of the reflecting device, the communication signal to an airborne terminal by means of a beam corresponding to the reflection weight.

2. The method according to claim 1, wherein before reflecting, according to the reflection weight of the reflecting device, the communication signal to the airborne terminal by means of the beam corresponding to the reflection weight, the method further comprises:
acquiring control information sent from the base station; and
adjusting, according to the control information, a reflection weight of a beam corresponding to a target transmission channel, wherein the target transmission channel is a transmission channel between the reflecting device and the airborne terminal.

3. The method according to claim 2, wherein before adjusting, according to the control information, the reflection weight of the beam corresponding to the target transmission channel, the method further comprises:
acquiring location information of the reflecting device and location information of the airborne terminal; and
determining the control information according to the location information of the airborne terminal and the location information of the reflecting device.

4. The method according to claim 3, wherein the reflecting device comprises a plurality of reflecting units to be used; and
determining the control information according to the location information of the airborne terminal and the location information of the reflecting device comprises:
selecting, according to the location information of the airborne terminal and the location information of the reflecting device, a target reflecting unit from the plurality of reflecting units to be used, and determining a reflection weight corresponding to the target reflecting unit; and
determining the control information according to the reflection weight corresponding to the target reflecting unit.

5. The method according to claim 1, wherein acquiring the communication information sent from the base station comprises:
acquiring the communication information sent from the base station through at least one of a first transmission channel and a second transmission channel, wherein the first transmission channel is a line of sight path transmission channel between the reflecting device and the base station, and the second transmission channel is a no line of sight path transmission channel between the reflecting device and the base station.

6. The method according to claim 1, wherein after reflecting, according to the reflection weight of the reflecting device, the communication signal to the airborne terminal by means of the beam corresponding to the reflection weight, the method further comprises:
reflecting a beam corresponding to a response signal sent from the airborne terminal to the base station;
wherein the response signal carries a response message which is information fed back by the airborne terminal for the communication information.

7. The method according to claim 1, wherein the communication information comprises at least one of broadcast information, channel state information, downlink control information, or downlink service information.

8. An information transmission method applied to a base station, comprising:

sending a communication signal carrying communication information to a reflecting device so that the reflecting device reflects, according to a reflection weight of the reflecting device, the communication signal to an airborne terminal by means of a beam corresponding to the reflection weight.

9. The method according to claim 8, wherein before sending the communication signal carrying communication information to the reflecting device, the method further comprises:
   acquiring control information, wherein the control information is configured to adjust a reflection weight of a beam corresponding to a target transmission channel, and the target transmission channel is a transmission channel between the reflecting device and the airborne terminal; and
   transmitting the control information to the reflecting device.

10. The method according to claim 9, wherein acquiring the control information comprises:
   acquiring location information of the reflecting device and location information of the airborne terminal; and
   determining the control information according to the location information of the airborne terminal and the location information of the reflecting device.

11. The method according to claim 10, wherein before transmitting the control information to the reflecting device, the method further comprises:
   acquiring location information of the base station; and
   determining, according to the location information of the base station and the location information of the reflecting device, an angle of a beam corresponding to a first transmission channel, wherein the first transmission channel is a line of sight path transmission channel between the reflecting device and the base station.

12. The method according to claim 11, wherein the first transmission channel comprises: a transmission channel based on channel state information, and/or a transmission channel based on a synchronization signal and physical broadcast channel (PBCH) block.

13. The method according to claim 9, wherein the target transmission channel comprises: a channel determined based on a first beam of the airborne terminal, or a channel determined based on a second beam of the airborne terminal, wherein the first beam has a beam width smaller than that of the second beam.

14. The method according to claim 13, wherein after transmitting the control information to the reflecting device, the method further comprises:
   processing, under the condition that the target transmission channel is the channel determined based on the second beam of the airborne terminal, information transmitted through the target transmission channel based on a maximum ratio combining principle to obtain response information;
   wherein the response information is response information fed back by the airborne terminal for the communication information.

15. A reflecting device, comprising:
a first acquiring module configured to acquire communication information sent from a base station, wherein the communication information is carried by means of a communication signal; and
a reflecting module configured to reflect, according to a reflection weight of the reflecting device, the communication signal to an airborne terminal by means of a beam corresponding to the reflection weight.

16. A base station,
configured to perform the method according to claim 8.

17. An information transmission system, comprising:
a reflecting device configured to perform the information transmission method according to claim 1;
a base station configured to send a communication signal carrying communication information to the reflecting device so that the reflecting device reflects, according to a reflection weight of the reflecting device, the communication signal to an airborne terminal by means of a beam corresponding to the reflection weight; and
an airborne terminal configured to acquire communication information sent from the base station, generate response information according to the communication information, and transmit the response information to the reflecting device through a target transmission channel so that the reflecting device transmits the response information to the base station.

18. An electronic device, comprising:
one or more processors; and
a memory having one or more programs stored thereon which, when executed by the one or more processors, cause the one or more processors to perform the information transmission method according to claim 1.

19. A non-transitory computer readable storage medium, wherein the non-transitory computer readable storage medium has a computer program stored thereon which, when executed by a processor, causes the information transmission method according to claim 1 to be implemented.

20. An electronic device, comprising:
one or more processors; and
a memory having one or more programs stored thereon which, when executed by the one or more processors, cause the one or more processors to perform the information transmission method according to claim 8.

* * * * *